(12) United States Patent
van Krieken et al.

(10) Patent No.: US 8,486,480 B2
(45) Date of Patent: Jul. 16, 2013

(54) CONTROLLED ACIDIFICATION OF FOOD PRODUCTS USING LACTIC- OR GLYCOLIC ACID OLIGOMERS/DERIVATIVES

(75) Inventors: Jan van Krieken, Gorinchem (NL); Edwin Bontenbal, Gorinchem (NL)

(73) Assignee: Purac Biochem B.V., Gorinchem (NL)

(*) Notice: Subject to any disclaimer, the term of this patent is extended or adjusted under 35 U.S.C. 154(b) by 1771 days.

(21) Appl. No.: 10/739,036

(22) Filed: Dec. 19, 2003

(65) Prior Publication Data
US 2004/0156951 A1 Aug. 12, 2004

Related U.S. Application Data

(60) Provisional application No. 60/434,634, filed on Dec. 20, 2002.

(51) Int. Cl.
*A23L 1/22* (2006.01)

(52) U.S. Cl.
USPC .............................. 426/650; 426/39; 426/531

(58) Field of Classification Search
USPC ........................................ 426/39, 531, 650
See application file for complete search history.

(56) References Cited

U.S. PATENT DOCUMENTS

| | | |
|---|---|---|
| 2,982,654 A | 5/1961 | Hammond et al. |
| 3,340,066 A | 9/1967 | Corbin, Jr. et al. |
| 3,386,835 A | 6/1968 | Schaap |
| 4,282,385 A | 8/1981 | Metz et al. |
| 4,374,152 A | 2/1983 | Loter |
| 5,023,349 A | 6/1991 | Bhatia |
| 6,320,077 B1 * | 11/2001 | Eyal et al. ............... 562/589 |

FOREIGN PATENT DOCUMENTS

| | | |
|---|---|---|
| EP | 1 048 665 A1 | 11/2000 |
| FR | 2151478 A | 4/1973 |
| FR | 1458051 A | 6/1976 |
| GB | 1138765 A | 1/1969 |
| GB | 2 029 192 A | 3/1980 |
| GB | 2 048 047 A | 12/1980 |
| JP | 57-043657 A | 3/1982 |
| JP | 10-279577 A | 10/1998 |
| WO | WO 96/25855 A | 8/1996 |
| WO | WO 00/65924 A | 11/2000 |

OTHER PUBLICATIONS

IUPAC Compendium of Chemical Terminology, Electronic version, http://goldbook.iupac.org/O04282.html, p. 1. Transformed and rewritten from PDF version (entry http://www.iupac.org/goldbook/O04282.pdf) by: Miloslav Nic, Jiri Jirat, Bedrich Kosata, ICT Prague, Czech Republic.*
Patent Abstracts of Japan, vol. 006, No. 114, Jun. 25, 1982.
Database WPI, Section Ch, Week 199901, Derwent Publications Ltd., London, GB: AN 1999-005216, XP002254257.

* cited by examiner

*Primary Examiner* — Jyoti Chawla
(74) *Attorney, Agent, or Firm* — Gilberto M. Villacorta; Sunit Talapatra; Foley & Lardner LLP

(57) ABSTRACT

This invention relates to the controlled acidification of food products, like dairy products, meat etc. By acidification, food products are protected against harmful microbiological cultures and food can get a certain texture, e.g. the coagulation of dairy products or the drying and texture formation of dried sausages. The invention comprises a new method of acidifying food products in a controlled way. Using lactic- or glycolic acid oligomer/derivatives and salts or derivatives thereof achieve this controlled acidification.

13 Claims, 7 Drawing Sheets

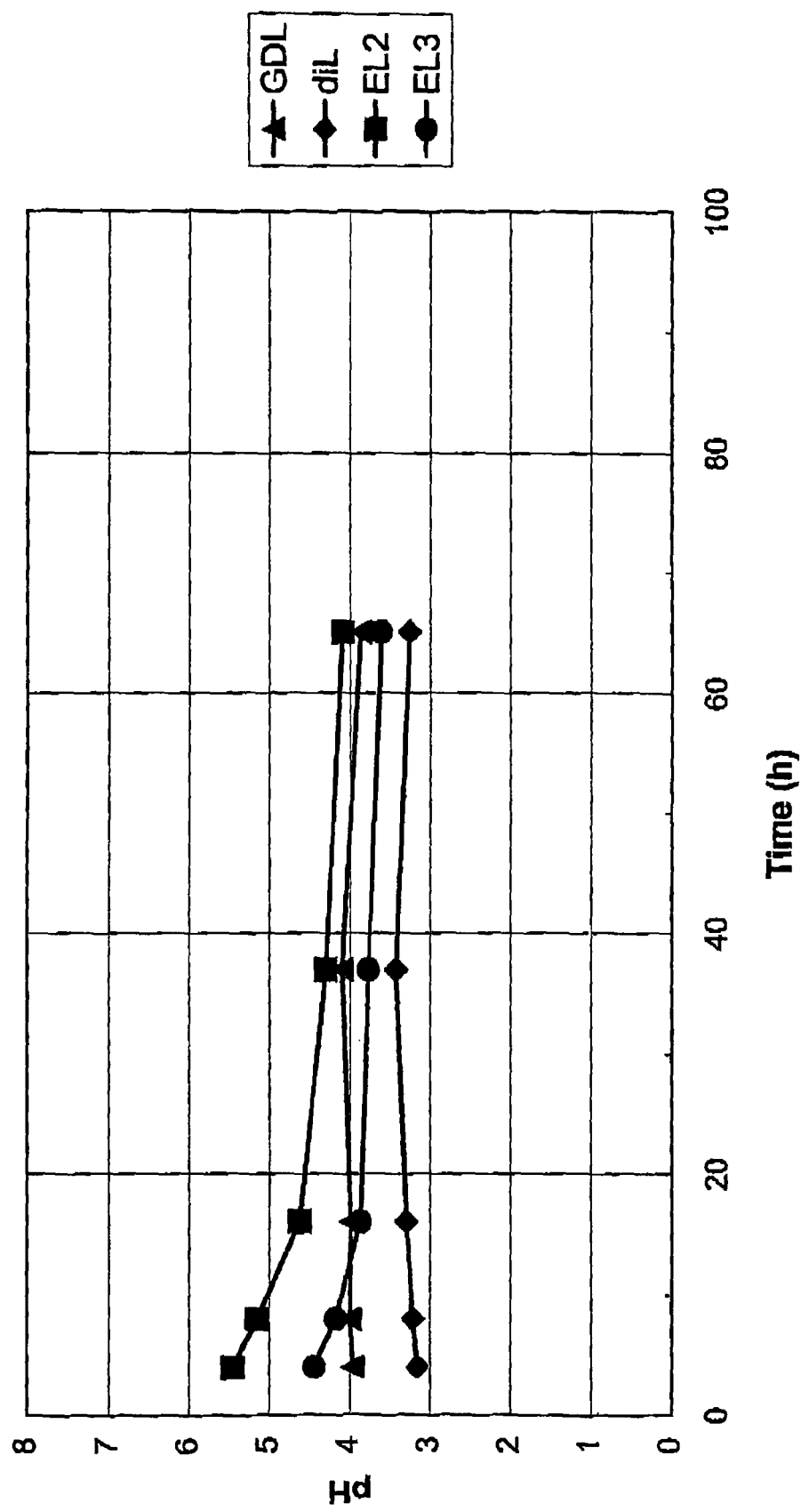

CONTROLLED ACIDIFICATION OF FOOD PRODUCTS USING LACTIC- OR GLYCOLIC ACID OLIGOMERS/DERIVATIVES

The present invention relates to the controlled acidification of food products, like dairy products, meat etc. Acidification of food is used to give it a certain flavour and texture, e.g. the coagulation of dairy products or the drying and texture formation of dried sausages. In addition to that, acifidication protects food against bacterial spoilage. The invention also comprises food products which are acidified with this controlled acidification method.

Reducing the pH level of dairy and other food products is part of a process of fermentation, which is necessary to get a certain texture (cheese, dried sausages) and/or is used to protect the food product against harmful microbiological activity. For these reasons, pH's lower than 5 or even 4.5 are often required.

The lowering of the pH level can be achieved by:
1) direct acidification: (food grade) acids like phosphoric, lactic, acetic, citric acid etc. are added to the food, or by
2) indirect acidification: adding acid starter cultures (bacterial acidification) or adding acidogens or acid releasing agents (indirect chemical acidification).

Combinations of these methods can also be applied.

During the acidification process of food, it is important to control the acidification rate. For example, a too fast drop of the pH during cheese making leads to a large inclusion of whey in the curd. This creates an undesired bitter, hard and brittle cheese. On the other hand, when acidification is too slow, for instance when the microbiological starters are being affected by bacteriophages that have not been eliminated by a pasteurisation process, a bad curd is obtained. Furthermore, too slow acidification will start pathogens to grow.

When in the case of a meat paste the pH drops too fat, this leads to a prematurely firm texture, which makes the stuffing of the meat in the casing more difficult.

Acidification should not be confused with the simple addition of food-grade acids to foodstuff for antibacterial purposes. With acidification is meant the decrease in pH during the preparation of a foodstuff so that a change of texture and taste is achieved such as acidifying milk to obtain yoghurt or cheese, or preparing dried sausages by acidification of ground meat.

Direct chemical acidification of cheese has been mentioned in a number of patent publications. U.S. Pat. No. 4,328,115 mentions the acidification of food products, including some kinds of cheeses, but also tofu and bakery products. In that document, a process is described for the formation of acids by a reaction of hydrogen peroxide ($H_2O_2$) with aliphatic C2-6 diones. A disadvantage here is that hydrogen peroxide is very reactive and will not only react with the diones but could also react with the food or oxidise essential ingredients, leading to deterioration of the food. Furthermore, the hydrogen peroxide in food is generally not desirable.

In EP 755630 a combination of ultra filtration and a direct acidification with food-grade acids like lactic acid, citric acid, sorbic acid, phosphoric acid is mentioned. Furthermore, the direct addition of acids does not allow control of the curd formation. Beside that, the addition of e.g. citric acid could change the taste of the cheese.

Direct acidification of non-dairy products with food grade acids is of course also possible: HP 0180281 teaches the use of inorganic acids (phosphoric acid) to lower the pH of protein containing meat analogues as alternative to thermal sterilisation. U.S. Pat. No. 4,788,070 uses phosphoric acid, or (a combination) of organic acids for acidification to obtain internal pH-values of 4.6 or lower.

A special point of concern for these direct chemical acidification methods is of course the control of the pH: by adding these acids, one can easily create pH gradients within the product which makes it difficult to control the formation of the desired texture. Hence, a controlled acidification, for example by using microbiological cultures, is a more suitable way to acidify food products and to obtain the desired textures.

The use of microbiological cultures as indirect acidification method for food products like cheese, yoghurt and meat is well known. For example, GB 804296 or EP 0641857 teach the preparation of meat products, like dry sausages, etc, by using lactic acid-producing micro organisms to get the desired texture of the meat. Here, acidification belongs to the integral process of obtaining fermented meat products.

However, the use of starter cultures of micro organisms can lead to adverse effects, because the growth of said micro organisms is difficult to control. It may be influenced by temperature, salt concentration and the presence of "natural" or synthetic inhibitors. Further, it causes risk of contamination. Hence, a method that on the one hand overcomes the problem of an uncontrolled pH drop, but on the other hand does not use micro organisms, would solve the above-mentioned problems. Therefore, the way of indirect chemical acidification was introduced: an acidogen releases acids in a controlled way.

The indirect chemical acidification of meat is e.g. taught by GB 949287, which discloses the use of glucono-delta-lactone (hereinafter referred to as GDL) in a solid acid composition to brine meat and to get the red colour development of meat. The GDL slowly hydrolyses to gluconic acid, lowering the pH.

U.S. Pat. No. 4,851,237 describes the indirect chemical acidification powdered milk in the presence of water during the cheese making process. The acidogen used in this process belongs to the group of gluconolactones and glucoheptonolo-actones, preferably glucono-delta-lactone. The glucono-delta-lactone reacts in the milk suspension to gluconic acid, and thus results in pH values of about 5.0-6.6.

Glucono-delta-lactone as acidogen and coagulation stimulant has also been mentioned in a number of other documents: for the making of improved sour cream (GB 1,124,238), in the preparation of yoghurt like food (U.S. Pat. No. 4,842,873) and for the continuous production of cottage cheese (WO 9100690).

The use of glucono-delta-lactone to acidify food provides an elegant way for the acidification of food products, but has also some drawbacks:
1) the method with glucono-delta-lactone is more expensive than in e.g. the previously described prior art U.S. Pat. No. 4,328,115,
2) the coagulation time cannot be set so that in some cases the desired texture is not obtained,
3) this method leads to the formation of gluconic acid or gluconic acid residues, which might be detrimentally affect the taste in some cases, and
4) the GDL can be utilised by micro organisms as a carbon source and therewith al types of metabolites may be formed which may detrimentally affect the taste as well.

Further, in some patent publications such as U.S. Pat. No. 3,340,066, GB 2029192, FR-1485051, JP-10/279577, U.S. Pat. No. 4,374,152, GB1,38,765 dilactide is used for the acidification of milk and minced meat etcetera. The use of dilactides has the disadvantage that the hydrolisation time, and thus the coagulation time cannot be set.

From the above, it is apparent that there is a need for a cost effective, well-controlled chemical acidification method for food, that does not (negatively) affect the taste of that food or introduces acids that might be undesirable.

According to the present invention such an acidification method has been found. Thus a method for controlled acidification of food products is provided wherein a lactic- or glycolic acid oligomer/derivative or salt thereof according to the following formula:

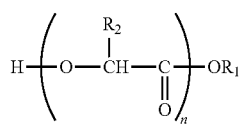

in which $R_1$ is a substituent chosen from the group H, alkyl having 2-10 carbon atoms, a glyceroyl group, $Na^+$, $K^+$, $Ca^{2+}$, $Fe^{2+}$, $Fe^{3+}$, $Al^{3+}$ or $Mg^{2+}$, and n is 1-50, and in case $R_1$ is H, n is 2-50; $R_2$ is hydrogen or methyl and each $R_2$ may be independently chosen;

is added to food product, and the food product is acidified in a controlled way by spontaneous hydrolysis of the oligomer/derivative or salt thereof.

With oligomers are meant compounds comprising of at least two acid units, being lactic acid and/or glycolic acid units. In view of practical limitations, the oligomers will contain at the most 50 acid units, preferably less than 10 acid units more preferably less than 5 acid units. Of course the oligomers may also be derivative-substituted. With derivative-substituted oligomers are meant alkyl derivatives such as ethyl, ethylhexyl, glyceroyl group ($CH_2OH$—$CHOH$—$CH_2O$—) derivatives. Possible oligomer salts are $Na^+$, $K^+$, $Ca^{2+}$, $Mg^{2+}$, $Fe^{2+}$, $Fe^{3+}$, $Zn^{2+}$, $Al^{3+}$ salts of the oligomer. In general one should ensure that the compounds formed upon hydrolisation of the lactic or glycolic acid units or derivatives are food-approved such as glycerol, ethanol etcetera. The advantage of using oligomers is that no additional compounds beside the glycolic acid and lactic acid are formed.

In the context of the invention, "oligomer/derivative" refers either to an oligomer comprising at least two acid units, being lactic acid and/or glycolic acid units, and wherein these acid units can also be derivatives of such an acid unit (being lactic acid and/or glycolic acid), or to a monomer derivatised with $R_1$ groups as defined in the formula, e.g. ethyl, ethylhexyl, glyceroyl group ($CH_2OH$—$CHOH$—$CH_2O$—).

Preferably $R_1$ is ethyl, a glyceroyl group, $Na^+$, $K^+$, $Ca^{2+}$ or $Mg^{2+}$. More preferably, $R_1$ is an ethyl group; $R_2$ is hydrogen or a methyl group and each $R_2$ group may be independently chosen. In other words, the oligomer may be built up from a mixture of glycolic acid units and lactic acid units. When $R_1$ is an alkyl, it my be linear, branched or cyclic.

With the term spontaneous hydrolysis is meant that hydrolysis occurs without the addition of catalysts or enzymes.

The compounds used according to the invention are readily soluble in water and are pH neutral upon addition.

The advantage of this acidification method of the present invention is that this controlled acidification, by hydrolysis of the lactic acid oligomers introduces natural acids in the food, which are normally formed during fermentation processes. This makes the product more similar to the product that would be formed if prepared in the traditional way. The method of the present invention enables the skilled person also to minimize or even eliminate the use of microbiological active material. Hence it is a method to acidify food in a safe way.

Another advantage of the present method is that the lactic acid and glycolic acid oligomers/derivatives offer a class of compounds that can be used for acidification in which the rate of acidification (rate of pH drop) and the final pH level can be chosen selectively by selecting one or more members of the class, the concentration thereof and the process parameters like temperature, agitation, order of addition, etcetera. Furthermore, the salt concentration and the taste required for the product can also easily be set by selecting the proper oligomer or derivative.

The preparation of lactic- and glycolic acid oligomers and derivatives is known to the person skilled in the art and needs no further elucidation here.

Lactic acid and glycolic acid oligomers usually comprise a mixture of oligomers with different degrees of polymerisation. Usually a small amount of higher (containing more than 4 acid units) and lower oligomers (containing less than 4 acid units) is present. These products are also part of the present invention. Hence, when in the context of this invention for example an oligomer of 2 lactate units is mentioned, this also includes products having an average degree of polymerisation of 2. Also combinations of derivatives, linear oligomers, its salts and derivatives may suitably be used in the present invention.

The choice of the number of acid units of the oligomer and/or the kind and ratio of different oligomers/derivatives in a mixture, will depend upon the concentration of the acidogen or acidogen combination to be added, the desired pH end value, the desired texture (e.g. yogurt or cheese) and the process parameters. The person skilled in the art will adapt the choice to the requirements of the end product and its production process.

For certain purposes, in addition to the above mentioned acidogens also a small amount of bacterial cultures can be added in order to acidify the food and/or get the desired texture. This can be done e.g. to slightly adapt the taste of a food product. Hence, an embodiment is also the acidification of food products by a combination of indirect chemical acidification with lactic- or glycolic acid oligomers/derivatives and adding specific bacterial cults.

The method of the present invention can be used for acidifying milk, e.g. to make cheese, yogurt, sour cream, but also other food products like tofu, pickled vegetables such as sauerkraut, meat, sausages and bakery products. Hence, the invention comprises also the dairy products, like cheese, milk, yogurt and sour cream, acidified according to the controlled acidification method of the present invention such as cottage cheese, ricotta etcetera. The invention also comprises meat or meat containing products, bakery products, soybean products, beer, and pickled vegetables as sauerkraut that are acidified according to the method described in the present invention.

A number of the applications of the present invention are described in more detail below.

There is not one single cheese making process, because there are numerous cheeses known. However, a global description of the main steps in the cheese making process using bacterial acidification can be given. For all industrially prepared cheeses, the milk is first subjected to a thermal treatment (pasteurisation) in order to kill most of the harmful bacteria. After this heat treatment, the milk is cooled and starter bacterial cultures are added to the milk at pH 6.5-6.8. Then, the milk is allowed to ripen and the coagulation process is started by adding rennet. Rennet causes a destabilisation f the casein micelles which in combination with the acidification causes the separation of the milk into a curd, a mixture of casine micelles and fat droplets, and whey. The curd is placed into a mould and the excess whey is removed by compression. This dehydrated curd can subsequently be ripened further to develop taste and dehydrate further. During curd formation salts and acids may be added and the curd may be subjected to stirring and heating to enable the curd formation. Also the cheese may be pickled from the outside to inhibit harmful bacteria.

In the controlled acidification process of the present invention, lactic- or glycolic acid oligomer/derivative instead of bacterial cultures are added. After pasteurisation, the milk is brought at about 0° C.-100° C., preferably between 30° C.-70° C. and the lactic- or glycolic acid oligomer/derivative is added. The amount of oligomer/derivative is determined by the desired final pH and depending on the kind of cheese desired and the $R_1$-group (H, ethyl, glyceroyl, $Na^+$, $K^+$, $Ca^{2+}$ or $Mg^{2+}$). The milk is stirred until complete solvation of the oligomer/derivative. The pH will drop due to a controlled formation of lactic acid by hydrolysis of the lactic acid oligomers. A well cuttable curd is obtained after half an hour to more than a day. As said above, also combinations of oligomers/derivatives may be added as acidogen.

Generally speaking, for the making of yoghurt, the milk or soymilk is usually pasteurised and than cooled down. The milk or soy milk will be kept at temperatures lower than 80° C., preferably lower than 30° C. Subsequently the acidogen will be added in an amount determined by the type of cheese and the desired final pH.

For making meat pastes, the meat is ground to achieve the desired degree of fineness. Then the other ingredients and/or additives, depending on the kind of meat, are added while mixing. Common ingredients are sodium chloride, dextrose and spices. The acidifying agent is added, either in powdered form or in solution. The acidogen will generally be added in an amount that results in 0.5 to 3% acid in the meat. The meat paste should be kept at temperatures lower than approximately 6° C., preferably lower than 0° C. Before or after storage, the meat can be stuffed in the casing. When desired, the meat can subsequently be stored in a smokehouse.

Sauerkraut may be prepared by cutting white cabbage and adding the acidogen according to the invention.

BRIEF DESCRIPTION OF DRAWINGS

FIG. 7 describes the change in pH value with time of glucono-delta-lactone (GDL), dilactide (diL), ethyl lactoyllactate (EL2) and ethyl lactoyllactoyllactate (EL3) in soy milk at 80° C. (pH measurements were started after 4 hours)

The present invention is further illustrated by means of the following non-limitative examples.

EXAMPLES

Example 1

Acidification Process in Water

According to this experiment the decrease of pH of aqueous solutions of acidogen is measured at 20° C. and 70° C. For these experiments 100 ml flasks for the 20° C. experiments and 1.5 L double walled glass vessels were used for the 70° C. experiments. The temperature was controlled with a water bath and the pH was measured with a pH meter type CG387 or a Biowatch pH controller of Applikon. Commercially available esters were used:

EL: ethyl lactate
EL2; ethyl lactoyllactate 99.5%
EL3: ethyl lactoyllactoyllactate, 94%
EL4: ethyl lactoyllactoyllactoyllactate, 60%
GDL: glucono-delta-lactone (COMPARATIVE)
diL: dilactides (COMPARATIVE)

Figure 1:
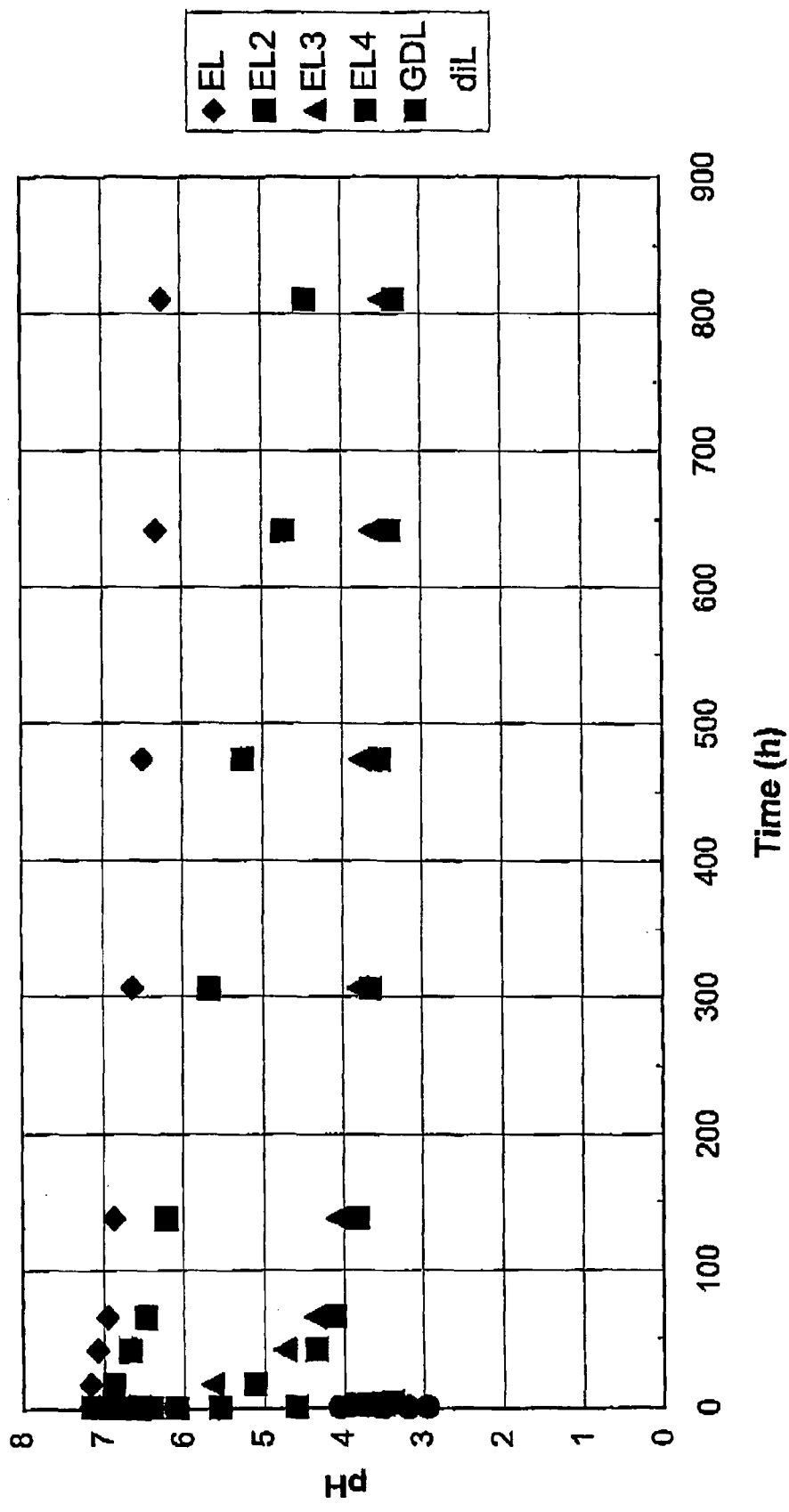
FIG. 1 describes the change in pH value with time of different acid forming compounds, including those of claim 1, in water at 20° C.
Figure 2:
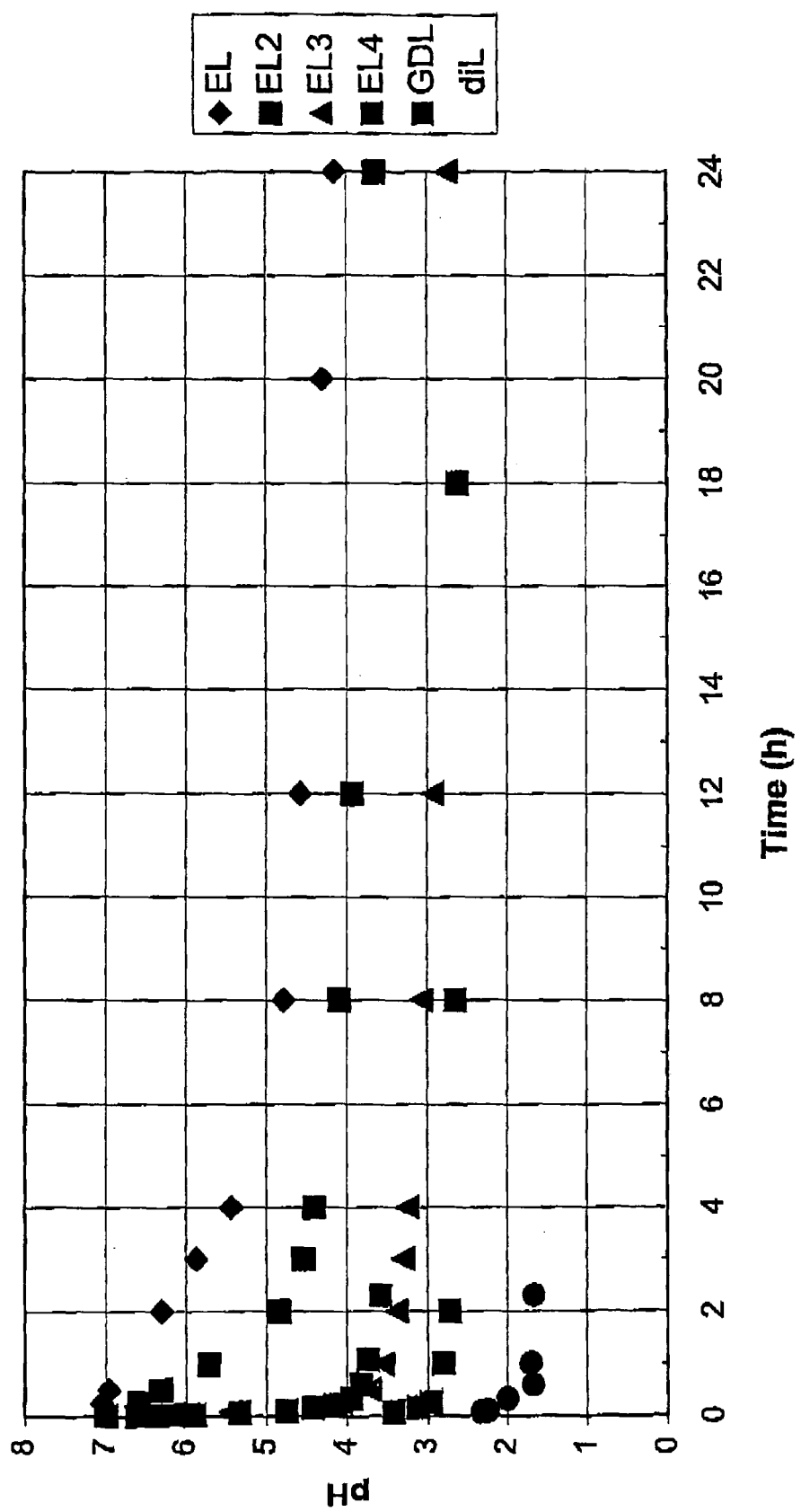
FIG. 2 describe the change in pH value with time of different acid forming compounds, including those of claim 1, in water at 70° C.

FIGS. 1 and 2 show the decrease of the pH of water with EL, EL2, EL3, EL4, GDL and diL, at 20° C. and 70° C. respectively. From these data it is clear that chemical acidification can be achieved with this class of compounds.

Example 2

Acidification of Milk or Soy Milk

The acidogen dilactide (Purasorb ® DL -lactide, from Purac Biochem B.V., ethyl lactoyl lactate (EL2, 99.5%), ethyl lactoyl lactoyl lactate (EL3, 94%) and Glucono-Delta-Lactone (GDL) were added to full fat milk (ex Friesche Vlag®) or soy milk (ex Alpro®)) in quantities of 0.6 or 1.2 wt %. The milk suspensions were kept at 0° C., 30° C. or 80° C., respectively, and are stirred until complete solution of the lactic acid oligomer. The stirring time is the same for all samples. The pH is measured before addition of the lactic acid oligomer, and after addition, the pH is monitored for several days. The desired pH end value in yoghurt is below 5, and preferably between about 4-4.5.

Figure 3:
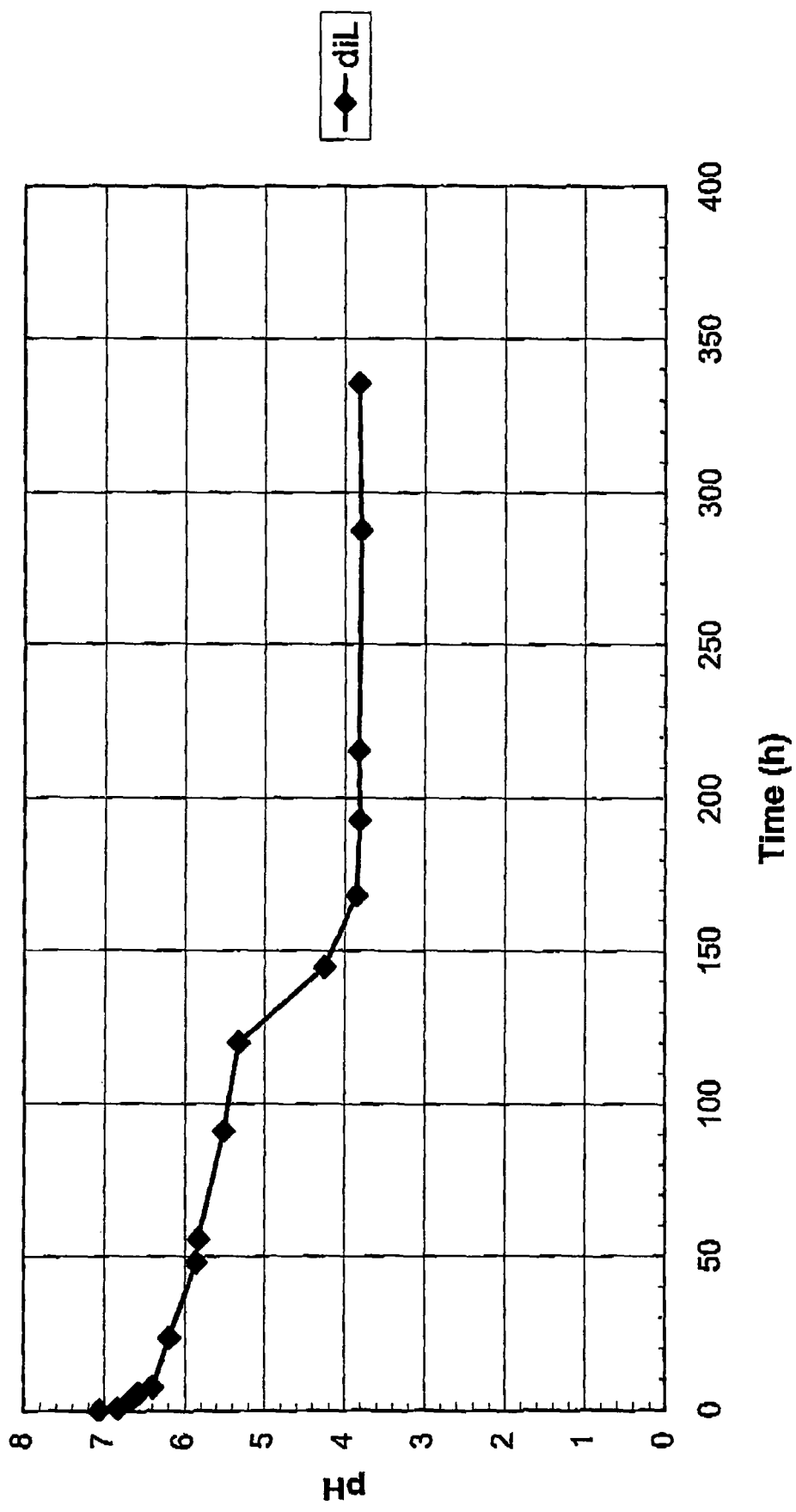
FIG. 3 describes the change in pH value with time of 0.6 wt % dilactides in soymilk at 0° C.
Figure 4:
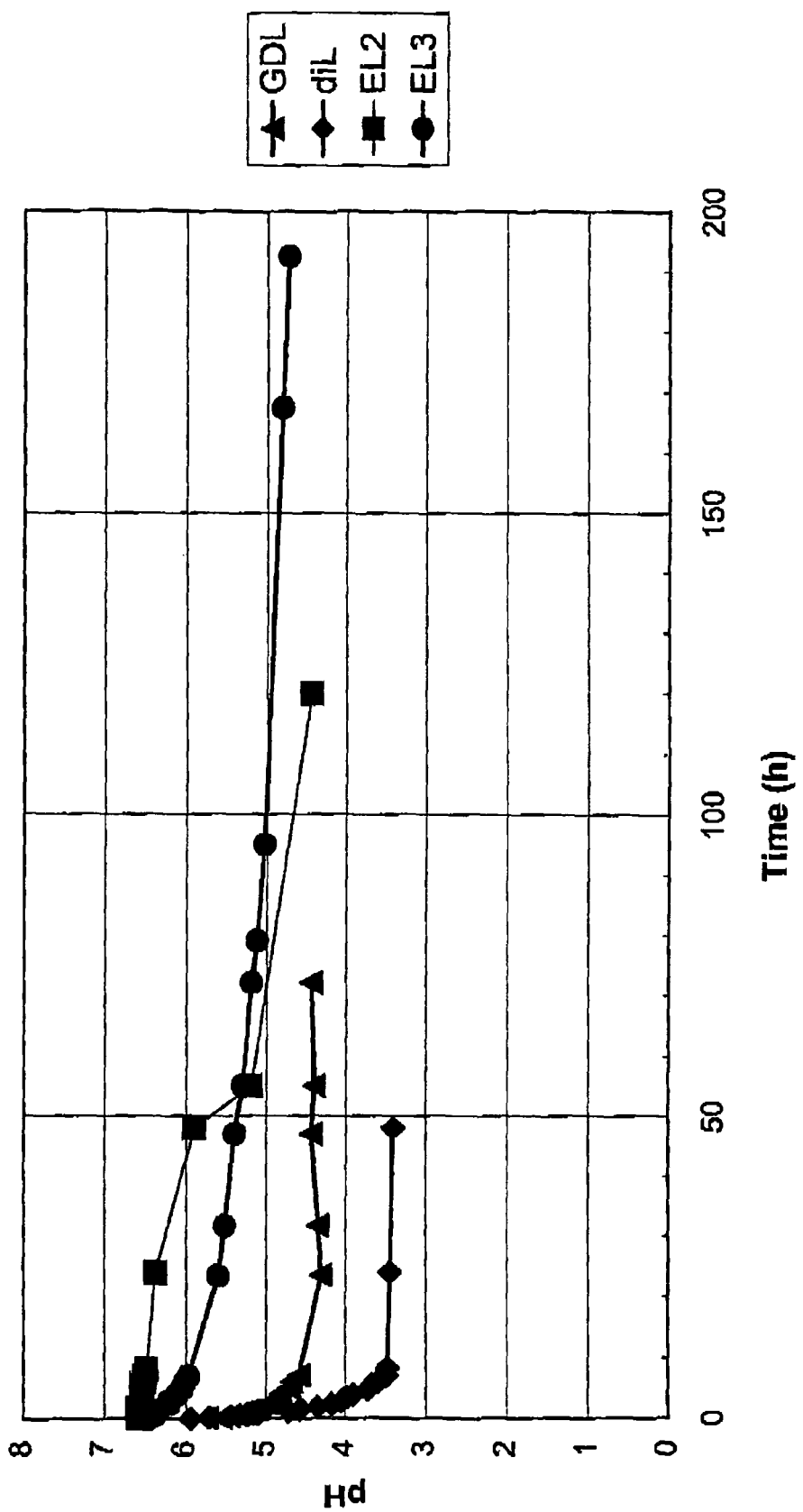
FIG. 4 describes the change in pH value with time of 1.2 wt % glucono-delta-lactone (GDL), dilactide (diL), ethyl lactoyllactate (EL2) and ethyl lactoyllactoyllactate (EL3) in milk at 30° C.
Figure 5:
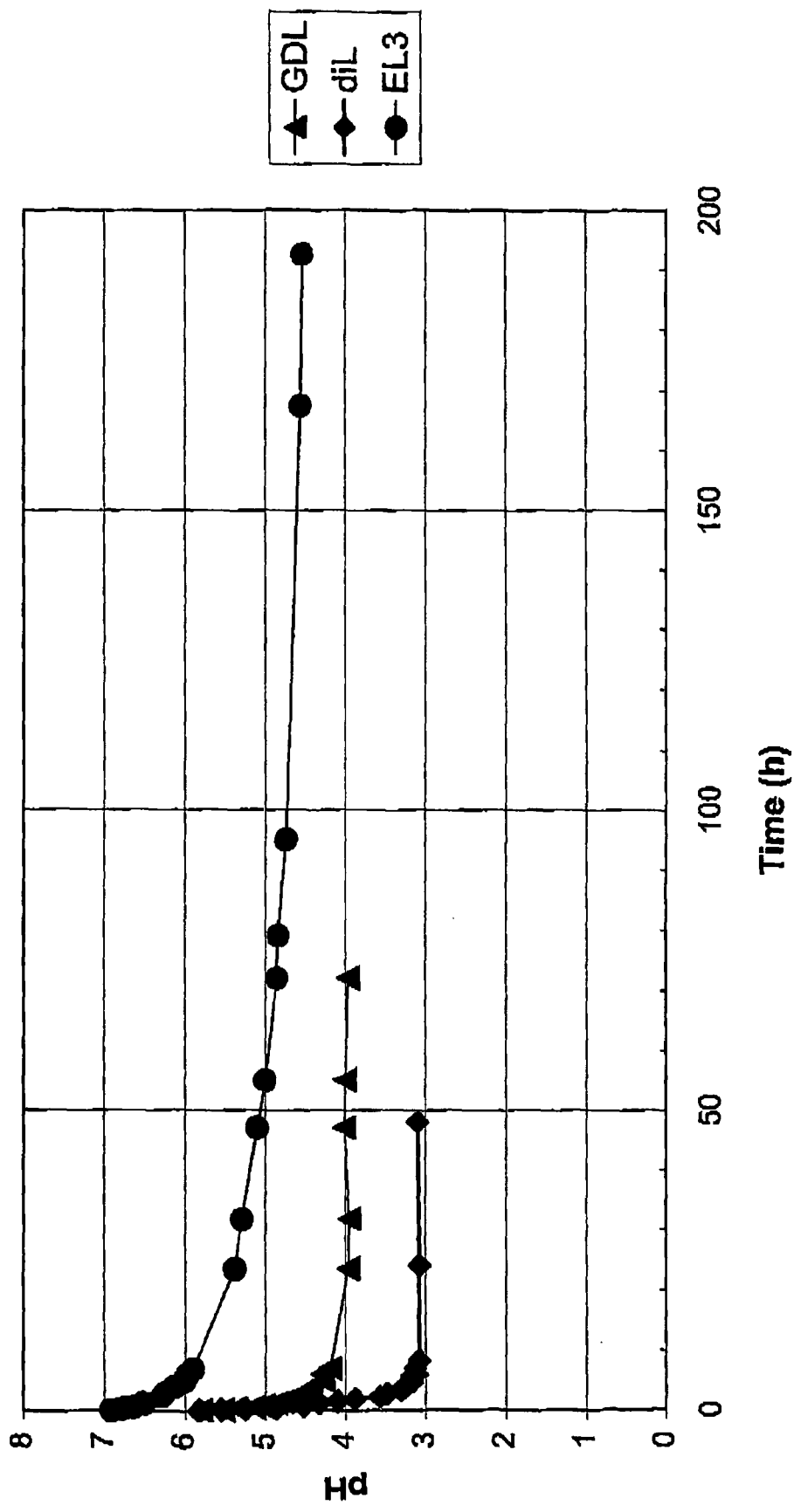
FIG. 5 describes the change in pH value with time of 1.2 wt % glucono-delta-lactone (GDL), dilactide (diL) and ethyl lactoyllactoyllactate (EL3) in soy milk at 30° C.
Figure 6:
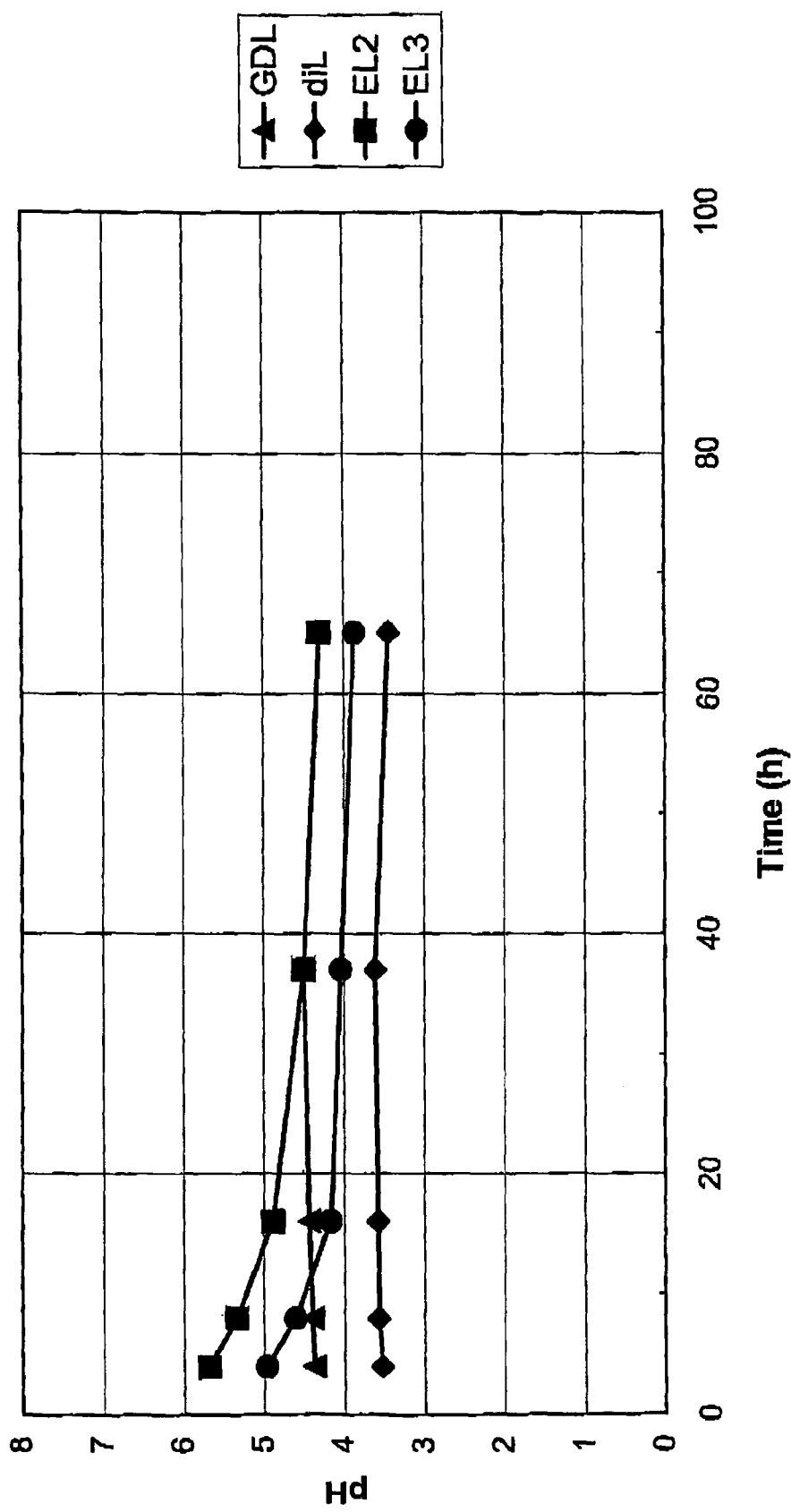
FIG. 6 describes the change in pH value with time of 1.2 wt % glucono-delta-lactone (GDL), dilactide (diL), ethyl lactoyllactate (EL2) and ethyl lactoyllactoyllactate (EL3) in milk at 80° C. (pH measurements were started after 4 hours)

The acidification is displayed in FIGS. 3 (soy milk, 0° C.), 4 (milk, 30° C.) and 5 (soy milk, 30° C.), 6 (milk, 80° C.) and 7 (soy milk, 80° C.), respectively. The measurements at 80° C. were performed in order to investigate the maximum pH decrease. In this experiment at 80° C. pH measurements were starer after 4 hours.

In table 1, the times that were required to reach a pH level <4.75 at the above mentioned temperatures are given for several of the samples:

TABLE 1

| | \multicolumn{8}{c}{Time (h) before a pH level of <4.75 or lower is reached} |
|---|---|---|---|---|---|---|---|---|
| | Milk | | | | Soy milk | | | |
| | GDL | diL | EL2 | EL3 | GDL | diL | EL2 | EL3 |
| 0° C., 0.6% | | | | | | 145 | | |
| 30° C., 1.2% | 5 | 1.2 | 120 | 192 | 1.8 | 0.8 | | 95 |
| 80° C., 1.2% | <5 | <1 | 37 | 8 | <4 | <4 | 16 | <4 |

From these data it can be concluded that diL and GDL have a very fast hydrolysis. This makes it difficult to set the coagulation time. The results teach that the time of acidification (and thus coagulation) is rather long for 1.2 wt % of EL2 or EL3 at 30° C. These data show that by selecting an acidogen according to the invention, its concentration and the working temperature, the acidification can be controlled.

Example 3

Acidification of a Meat Paste

In this example the acidification of a meat past was tested. The paste is acidified and than stuffed in a casing. It is important that the acidification (and thus coagulation) does not occur too fast. In case it does coagulate too fast, it becomes impossible to stuff the meat in the casing.

TABLE 2 ingredients for standard cooked sausage

| Ingredients | Amount (wt %) |
|---|---|
| Beef (10% fat) | 7 |
| Pork (8% fat) | 12.8 |
| Bacon (40% fat) | 69 |
| Water/ice | 6.00 |
| Colorozo salt | 2.00 |
| Spices | 0.35 |
| Phosphate | 0.40 |
| Dextrose | 0.40 |
| Sodium ascorbate | 0.05 |
| Wheat starch | 2.00 |

These ingredients are well mixed and the paste is held at 20° C. Then the acidifiers GDL and EL2 were added. The acidifiers were not solved beforehand. After a well mixing of the acidifiers and the meat (approximately 1 minute in a blender), the paste was cooled to −1° C., 6° C. and 20° C.

Ethyl lactoyllactate (EL2) and GDL from the same batches as described above were used in this test. Three different meat pastes were made: a blank (without any added acid), a paste with 0.8 wt % EL2 and a meat paste with 0.4 wt % GDL. These meat pastes were stored (in casing) overnight at −1° C., 6° C. and 20° C. The following results were obtained (table 3):

TABLE 3 pH values of meat paste after 24 h storage

| | Blank | GDL | EL2 |
|---|---|---|---|
| −1° C. | | | 5.29 |
| 6° C. | 5.72 | 5.8 | 5.10 |
| 20° C. | | 5.47 | 4.85 |

After 24 h storage, the sausages from table 3 were cooked and the pH was measured again. The results are presented in table 4:

TABLE 4 pH values of stored sausages (from table 3) after cooking

| | Blank | GDL | EL2 |
|---|---|---|---|
| cooking after 24 h storage at −1° C. | | 5.72 | 5.34 |
| cooking after 24 h storage at 6° C. | 6.06 | 5.72 | 5.22 |
| cooking after 24 h storage at 20° C. | 6.04 | 5.73 | 5.09 |

After a second cooking, the pH of the sausage based on the meat paste to which EL2 was added did not change. A commercial smoked sausage had a pH between 5.1 and 5.3.

What is claimed is:

1. A method for acidification of a food product, comprising adding to the food product an oligomer having a terminal alkyl or glycerol ester according to the following formula:

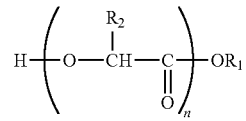

in which $R_1$ is an alkyl having 2-10 carbon atoms or glyceroyl; n is 2-50; and $R_2$ is independently hydrogen or methyl;
wherein the acidification occurs without the addition of catalysts or enzymes.

2. The method according to claim 1, wherein $R_1$ is an ethyl group.

3. The method according to claim 1 in which n is 2-10.

4. The method according to claim 1 in which n is 2-5.

5. The method according to claim 1, wherein the food product is a dairy product.

6. The method according to claim 5, wherein the food product is cheese, milk, yoghurt or sour cream.

7. The method according to claim 1, wherein the food product is meat or a meat-containing product.

8. The method according to claim 1, wherein the food product is a bakery product, a soybean product, beer or pickled vegetable.

9. The method according to claim 1, wherein the food product is sauerkraut.

10. A food product acidified according to claim 1.

11. A dairy product acidified according to claim 1.

12. A meat or meat-containing product acidified according to claim 1.

13. A bakery product, soybean product, beer, or pickled vegetable acidified according to claim 1.

* * * * *